July 22, 1952            J. LYSAK            2,603,915

METHOD OF MAKING SEALS FOR COAXIAL ELECTRON DISCHARGE DEVICES

Filed Aug. 27, 1949

INVENTOR
JOHN LYSAK
BY
William A. Zalesak
ATTORNEY

Patented July 22, 1952

2,603,915

UNITED STATES PATENT OFFICE 2,603,915

METHOD OF MAKING SEALS FOR COAXIAL ELECTRON DISCHARGE DEVICES

John Lysak, Newark, N. J., assignor to Radio Corporation of America, a corporation of Delaware Application August 27, 1949, Serial No. 112,732

5 Claims. (Cl. 49—81)

The invention relates generally to methods of making seals and more particularly to a method of making seals between coaxial elements of electron discharge devices.

Some types of electron discharge devices comprise coaxial elements and are useful at ultra high frequencies. One such device comprises a diode employed to detect noise factors in a circuit without impairing the normal functions of the circuit. Such diode is described and claimed in Patent 2,506,644 issued to H. Johnson. One feature of the diode referred to is the provision of a filamentary connector between elements of the inner coaxial member and which extends laterally of said inner member to comprise a projection from the periphery of said member. Another feature involves the relative lengths of the inner and outer members of the coaxial structure. The inner member is longer than the outer member to provide for extensions of the inner member from the ends of the outer member. These extensions are adapted to serve as contact members and it is desirable that they provide a maximum area of surface contact. The inner and outer members are usually fixed with respect to each other by rings of insulating material filling restricted annular spaces adjacent the ends of the outer member. These rings serve to close the ends of the outer member and to provide a space therein that may be evacuated.

Several difficulties characterize the manufacture of a device of the type described. These difficulties are centered in the seal effected between the inner and outer members by the sealing rings referred to. Some types of seals heretofore used involve application of a sealing ring of insulating material to both the inner and outer members in view of the ease with which the two bodies of sealing material may subsequently be fused to form a seal. However, the presence of a sealing ring on the outer member renders insertion of the inner member therein difficult because of the care required to prevent damage to the filamentary connector referred to. A further disadvantage of this practice has been the lack of uniformity in the amount of insulating material used. This lack of uniformity has resulted from the fact that the prior practice described required hand glass blower techniques. This lack of uniformity has heretofore resulted in variations in the seals with consequent variations in the electrical characteristics of the devices in which they are used.

Other types of seals heretofore used involve the application of a single sealing ring at each end of the device, the sealing ring being first fixed to the inner member prior to the assembly of the device. While this type of sealing ring has to some extent avoided the difficulty characterizing the use of a sealing ring on the outer member as described above, it has not been completely satisfactory. The disposition of the entire sealing ring within the outer member has resulted in a shielding of the ring from sealing fires employed to fuse the ring to the outer member. This has necessitated the application of more heat to the outer member than would be required if the fires could be applied directly to the ring. As a consequence the heat quantity required for making a seal according to this prior practice is often so high as to damage the seal previously made between the sealing ring and the inner member. Furthermore the portions of the inner member extending from the ends of the outer member are appreciably heated and the softened mass of the sealing ring has a tendency to creep along the inner conductor and ball up thereon. The annular end surface between the two coaxial members that the sealing ring of this type provides becomes deformed and reduces the surface area of the projecting portion of the inner member required for a good contact.

Accordingly it is the object of the invention to provide an improved method of making a seal between relatively closely spaced coaxial members.

A further object is to provide a sealing method using sub-assemblies for the inner and outer members of a coaxial device wherein the outer member is free from obstruction on its inner surface to facilitate assembling of the device.

Another object is to provide an improved method for making seals at end portions of a coaxial device between relatively closely spaced coaxial members without impairing good coupling characteristics of said end portions.

A further object is to provide a method for making flat surfaced seals between a flat ended coaxial device having two coaxial and relatively closely spaced members joined by said seals.

Another object is to provide a method of making a glass-to-metal seal between two relatively closely spaced coaxial metal members and an intermediate body of insulating material, wherein a surface of said insulating body extending from one to the other of said metal members is substantially flat.

A further object is to provide a method of sealing a glass beaded metallic member to another metallic member without disturbing the seal of the glass bead to the first-named metallic member.

Another object is to provide a method of forming uniform seals in a plurality of devices having relatively closely spaced members.

A further object is to provide a novel method of forming a sealing ring for use between two coaxial members.

Another object is to provide an advantageous method of making an electron discharge device.

According to the invention the foregoing difficulties are overcome and the objects referred to are realized by the use of a sealing ring of novel shape and predetermined diameter. The sealing ring is provided with an end surface that is flat adjacent its inner edge and that tapers adjacent the periphery of the ring, the taper providing an annular mass of insulating material. The sealing ring is first sealed to the inner member and is of a diameter that is slightly less than the inner diameter of the outer member for ease in assembling the members. When the inner and outer members of the device are assembled for sealing, the tapered portion of the ring extends beyond the end of the outer member and the flat portion of the ring surface referred to is substantially coplanar with respect to an end of the outer member. This sealing ring and the manner of disposing it are advantageous in several respects. The extending tapered portion of the sealing ring is directly accessible to the sealing fires to thereby reduce the heat quantity required for a seal with consequent preservation of the previously made seal between the ring and the inner member. A uniform mass of sealing material is used in each ring as a consequence of a novel method of forming the rings. A reservoir of sealing material is provided so that the diameter of the ring may be substantially less than that of the inner portion of the outer member for ease in assembling the members. Displacement of the tapered portion of the ring from the inner edge of the sealing ring prevents a balling up of the sealing material on the inner member thereby contributing to the preservation of a desirably large contact surface on the inner member.

Further objects and advantages of the invention will become evident as the present description continues.

Referring to the drawing.

Figure 1:
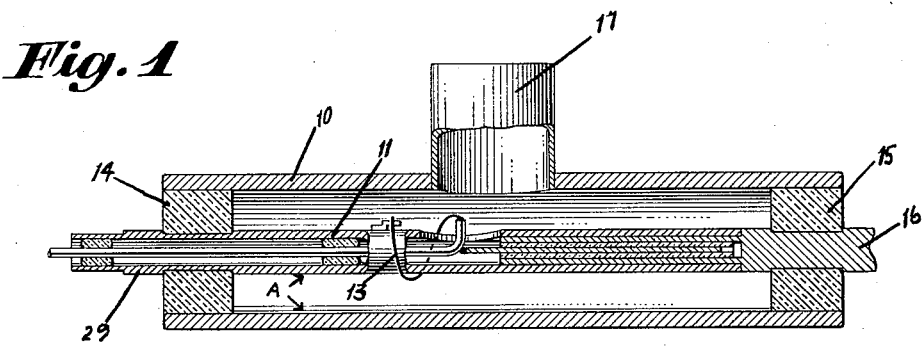
Figure 1 is a longitudinal sectional view of a coaxial device in which the practice of my invention is particularly advantageous.

Referring to Figure 1, there is shown an electrical device comprising a two element vacuum tube forming a section A of a coaxial transmission line. The section A comprises a cylindrical outer conductor 10 and a cylindrical inner conductor 11, the latter carrying a cathode filament 13. In order to fix the desired coaxial arrangement between the conductors or members referred to, insulating rings 14, 15 which may be of glass are sealed between end portions of the outer conductor 10 and the inner member comprising inner conductor 11 and an elongated metal member 16. Member 16 telescopes into member 11 for a purpose described in the aforementioned application of Johnson. The device may be evacuated through suitable means such as the exhaust tube 17. It will be noted the outer end surfaces of rings 14, 15 are relatively flat and substantially coplanar with the ends of the outer member or transmission line 10 for a purpose to be described.

For satisfactory use in noise measurement work at ultra high frequencies, a diode of the type described is advantageous since it may be inserted into ultra high frequency coaxial line circuits without affecting the circuit. One important consideration in associating the noise diode in a circuit to be tested is the coupling between the diode and the circuit. This coupling should involve maximum surface contact. The nature of the end surfaces of the rings 14, 15 materially affect the amount of surface engagement permitted between the diode and the circuit contact elements. Thus, if the sealing material which may be glass, balls up around the inner conductor of the diode so as to extend appreciably beyond the ends of the outer conductor 10, it serves effectively to stop complete insertion of the diode into a circuit element, thereby reducing the area of surface contact therebetween. Such reduced area of surface contact may introduce impedance effects to the circuit of a disturbing character and thereby render noise measurements inaccurate. If the outer end surfaces of the rings 14, 15 are flat and substantially coplanar with the ends of the outer conductor 10 a maximum area of surface contact is provided which avoids disturbance of the circuit being tested and contributes to accurate measurements.

Figure 2:
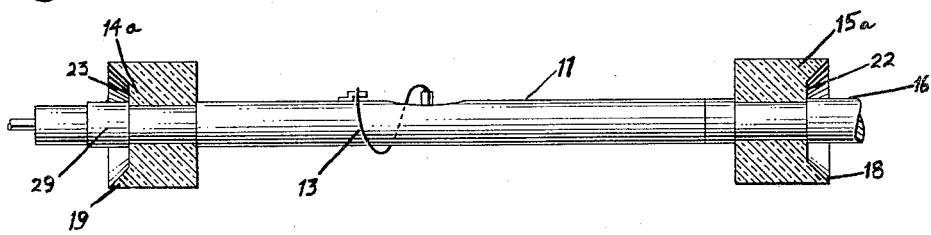
Figure 2 shows a side view partly in section of the inner member of the coaxial device of Figure 1.

In accordance with the method of the invention, a glass ring of novel configuration is sealed to each end portion of the inner member 11, 16 as shown in Figure 2. Sealing rings 14a, and 15a, which may be of glass, are provided with tapering peripheries 18, 19 and have a diameter slightly less than the inner diameter of the outer member 10.

Both of these features of the sealing rings are significant. The reduced diameter of the sealing rings permits an easy passage of the inner members 11, 16 into the outer member 10. The tapered peripheries of the sealing rings provides a reservoir of sealing material for filling the spaces between the sealing rings and the inner wall of the outer member 10. The displacement of the tapered portion of the rings from the inner members 11, 16 prevents a balling up of the sealing material on the inner member referred to. Furthermore the taper in the sealing rings requires a relatively small heat quantity for fusing and completing the seals. This preserves the seals previously made between the sealing rings and the inner members 11, 16. This reduced heat quantity and the relatively small portion of the mass of the sealing rings that is fused thereby serves to preserve uniformity in seals made in several different devices of the type described. This uniformity in seals is also accomplished as a result of the method of forming the sealing rings.

Figure 5:
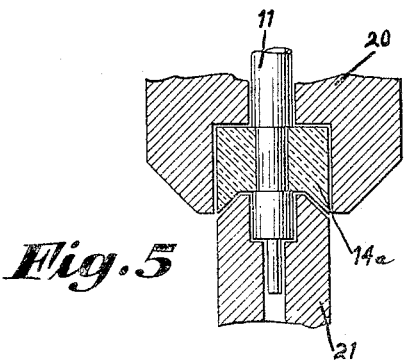
Figure 5 illustrates one way in which the novel insulating ring or bead on the inner member may be formed.

This method is shown in Figure 5 wherein a sealing ring 15a is suitably supported in proper positional relationship with respect to an end portion of element 11 of the inner assembly of the device shown in Figure 1 by means of a forming tool including upper member 20 and lower member 21. Heat is applied to the sealing ring to effectively seal the ring to the inner member 11 and to render the ring material soft so that a downward movement of upper member 20 of the forming tool towards the lower member 21 will result in shaping the sealing ring in conformity with the shaping surfaces of the forming tool. The shaping surfaces on the upper member 20 are such as to provide a right cylindrical end portion of the sealing ring and the shaping surfaces of the lower member 20 provide an annular taper rising outwardly to the periphery of the sealing ring.

The sealing of a ring of insulating material to each end portion of the inner members 11, 16 and forming the rings as shown in Figure 5, results in a sub-assembly as shown in Figure 2. The sealing of the insulating rings to the inner assembly 11, 16 may be accomplished prior to the assembly of the inner member in the outer member and prior to the mounting of the filament 13 on member 11, to facilitate the ring forming and sealing operation. Alternately the ring may be fixed to the inner member with the parts 11 and 16 in separated relationship. The sealing rings are sealed to the end portions of the inner assembly at positions where the outer surfaces 22, 23 of the rings are spaced from each other a distance equal to the length of the outer member 10, so that when the inner assembly is disposed within the outer member in proper position for sealing the rings to the latter, each end of the outer member is coplanar with one of the surfaces 22, 23 on the sealing rings 14a, 15a.

Figures 3, 4:
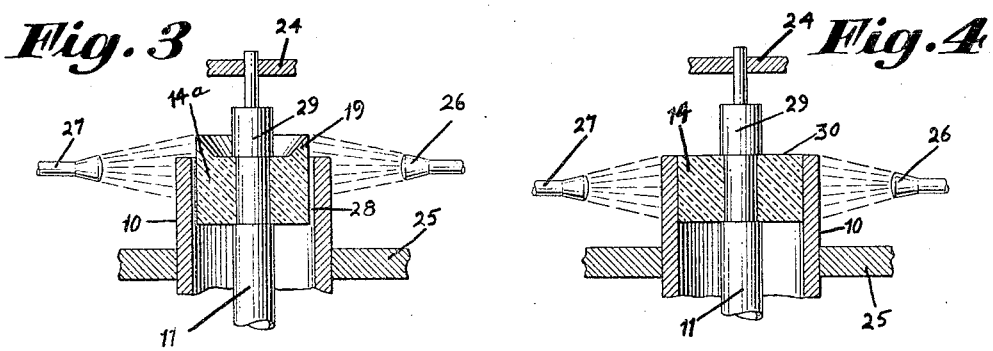
Figure 3 depicts the initial step in sealing the members of the coaxial device of Figure 1.
Figure 4 shows the final step in applicant's novel sealing method.

After the sealing rings 14a, 15a are sealed to the inner member as indicated above the device is assembled by inserting the inner member into the outer member with the surfaces 22, 23 coplanar with the ends of the outer member. The two members are held in this position as shown in Figure 3 by suitable supports 24, 25. It will be noted that in this position the taper 19 extends beyond an end of outer member 10.

The burners 26, 27 are disposed to play a flame that is substantially restricted to the outer cylindrical surface of the taper 19. The heating effect of the flame is therefore restricted to the tapered material and as a consequence the tapered material melts and fills the space 28 between the sealing ring and the outer member 10. It will be noted that during the application of the flames to the sealing ring in this position the portion 29 of the inner member is shielded from the flame and consequently remains substantially cool. If therefore any of the molten sealing material should travel towards the inner member, the material would not ball up on this member in view of its relative coolness. However, due to the tapered shape of the end surface of the sealing ring the molten sealing material would fall by gravity into the space 28 and be blocked from reaching portion 29 of the inner member by lower unmelted portions of the taper 19.

In view of the concentration of the flames on the tapered portion of the insulating ring, the outer member 10 is relatively cool and may render it therefore difficult for the molten sealing material to adhere thereto sufficiently well for a good seal. Accordingly, the burners are subsequently lowered to a position where the flames play upon the end portion of member 10 as shown in Figure 4. This heats the wall of the member 10 so as to be wetted by the sealing material for the formation of a good seal.

It will be noted in Figure 4 that the ultimate shape of the sealing ring 14 includes flat surface 30 substantially coplanar with the end of outer member 10. Furthermore the surface 30 forms a clean-cut right angle with the portion 29 of the inner conductor. As a consequence a contact member adapted to engage the portion 29 will contact a surface thereof that is in no way reduced by the sealing ring 14.

While Figures 3 to 5 show the formation and sealing of one ring to the inner member of the device it will be apparent that another ring is formed and sealed to the other end of the member in like manner.

It will thus be apparent that the device of the invention and the method of making it are characterized by many advantages absent in prior art techniques. Thus the manner of forming the sealing rings assures of an accurate control of the amount of sealing material in each ring contributing to uniformity in seals and good operation of the device. The formation of a taper in the sealing rings permits a control over the sealing operation whereby the finished seal is provided with a flat surface normal to a contact member for preserving a relatively large contact area on the device. This flat surface results automatically when the seal is made in accordance with the invention and requires no forming tool. Furthermore the control afforded by my novel method assures a good seal without harm to previously made seals. In addition, the taper permits a spacing of the sealing ring from the inner walls of the outer member and has the advantage of facilitating insertion of the inner member into the outer member for expediting assembly of the device.

While my invention is particularly useful in relatively small sized devices in which it is extremely difficult to make a seal between coaxial members and preserve a flatness at the end portions of the device, it may also find application in larger devices. Furthermore the invention may be used in instances where the outer member is made of a non-metallic substance such for example as glass. Accordingly the invention is not to be regarded as limited to the precise embodiment described but is to be given a scope commensurate with the appended claims.

I claim:

1. Method of assembling an electron discharge device having coaxial members, comprising sealing a ring of insulating material on the inner member, forming a taper in one end surface of said ring rising from an intermediate portion of said surface toward the periphery of said ring, extending the inner member with said ring into the outer member, with said taper extending beyond an end of the outer member, heating said taper only to melt it and heating an end portion of said outer member for forming a flat surfaced seal between said ring and said outer member.

2. Method of assembling an electron discharge device having coaxial members, comprising forming a sealing ring of insulating material of a diameter less than the internal diameter of the outer member, providing a taper in one end surface of said ring, fixing said ring to the inner member, extending the inner member into the outer member with said taper extending beyond an end of the outer member to provide a free space between the members, supporting said ring and said outer member against relative movement, heating the material forming said taper while so supported to cause it to melt and flow into the free space between the ring and the outer member, and heating the outer member to cause a seal between said ring and said outer member, whereby said end surface of said ring is substantially flat for good contact purposes.

3. Method of mounting two coaxial members and sealing the ends of the outer of said members, comprising sealing rings of insulating material at spaced portions of the inner member, forming said rings to provide a diameter thereof less than the inner diameter of the outer member and to provide a taper in the outer end surfaces of said rings, extending the inner member into the outer member with said tapers extending from the ends of the outer member, said rings and said outer member forming annular spaces therebetween, heating said tapers only to melt the material thereof to cause the same to flow into said annular spaces, and heating portions of said outer member adjacent said rings for causing said material to seal to said outer member, whereby said outer end surfaces of said seals are substantially flat throughout their extent for good contact purposes.

4. Method of making a seal between two coaxial members comprising providing a sealing ring on the inner member, forming said sealing ring to provide a taper in one surface thereof, said taper rising towards the periphery of said ring, and to provide a diameter of said ring less than the internal diameter of the outer member, extending said inner member into the outer member with said taper extending beyond an end of said outer member and with said ring spaced from the inner walls of the outer member to form an annular space therebetween, heating said taper only to cause the material thereof to melt and flow into said annular space, and heating said outer member to cause said material to seal thereto, whereby said surface of said ring is substantially flat for good contact purposes.

5. Method of forming a seal between two coaxial members comprising fixing a sealing ring to the inner member, supporting said sealing ring within the outer member, with a portion of said ring extending beyond one end of said outer member, said ring being spaced from the outer member to provide an annular space therebetween, heating said portion only of said ring to cause it to melt and flow into said annular space and heating said outer member to cause the molten portion to wet a portion of said outer member for effecting a seal therewith, whereby said molten material is free to travel in a direction away from the inner member to prevent a balling up of the material on said inner member.

JOHN LYSAK.

REFERENCES CITED

The following references are of record in the file of this patent:

UNITED STATES PATENTS

| Number | Name | Date |
| --- | --- | --- |
| 2,121,600 | Knowles et al. | June 21, 1938 |
| 2,125,315 | Ronci | Aug. 2, 1938 |
| 2,174,375 | Beggs | Sept. 26, 1939 |
| 2,296,307 | Power | Sept. 22, 1942 |
| 2,341,920 | Hull | Feb. 15, 1944 |